Patented July 25, 1933

1,919,417

UNITED STATES PATENT OFFICE

MAX DOHRN, OF BERLIN-CHARLOTTENBURG, AND PAUL DIEDRICH, OF FINKENKRUG NEAR SPANDAU, GERMANY, ASSIGNORS TO SCHERING-KAHLBAUM A. G., OF BERLIN, GERMANY

CHELIDAMIC ACID COMPOUND

No Drawing. Application filed June 17, 1931, Serial No. 545,074, and in Germany December 18, 1930.

Our invention refers to new chemical compounds of the chelidamic acid series, which have proven to be particularly useful for medical diagnosis and to the method of producing same.

The sodium salt of di-iodo chelidamic acid has hitherto been used in the practice of pyelographic diagnosis, i. e. in the production of X-ray pictures with intravenous injection of this salt. It has however been found that this compound is apt to produce an increase of the blood pressure and an excitation of the respiratory center. These effects are obviously due to the tautomeric character of the hydroxyl group in 4-position illustrated as follows:

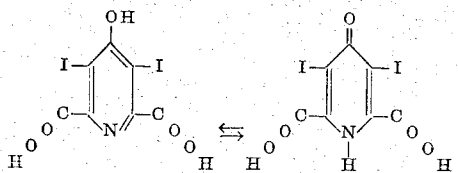

The pyridone character of di-iodo chelidamic acid is proven by the existence of a reaction with ferric chloride which is peculiar to the pyridones.

We have now found that the effect on the respiratory center and the increase in blood pressure will not occur if the alkali metal salts of di-iodo chelidamic acid are replaced by salts of the N-methyl di-iodo chelidamic acid having the formula:

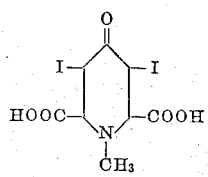

The N-methyl di-iodo chelidamic acid is a colorless, well crystallizing acid, which is little soluble in water and melts at 174° C., carbon dioxide being split off. With a caustic alkali the acid forms salts, which readily dissolve in water. With ferric chloride the reaction peculiar to the pyridones does not occur. N-methylation of di-iodo chelidamic acid can be effected by treating the acid in an alkaline medium with a methylating agent, such as methyl halide or methyl sulfate.

Example 1

43.5 grs. di-iodo chelidamic acid are dissolved in an excess of caustic potash and 38 grs. methyl sulfate are slowly added to the heated solution under vigorous stirring. After the methyl sulfate has been added, stirring is continued during one hour until the solution has cooled down, which is now over-acidified with hydrochloric acid. The precipitating N-methyl di-iodo chelidamic acid is still soiled with some unconverted di-iodo chelidamic acid. In order to remove same, the precipitate is taken up with water. The reddish brown iron salt of di-iodo chelidamic acid is precipitated by adding ferric chloride and the salt is separated by suction. From the filtrate the ferric chloride in excess is precipitated in the form of hydroxide by the addition of an alkali and after filtration the pure N-methyl di-iodo chelidamic acid is separated out by adding hydrochloric acid.

The N-methyl di-iodo chelidamic acid is decomposed at 174° C., carbon dioxide being split off. It readily dissolves in water, less readily in alcohol and ether.

From the ferric salt of the di-iodo chelidamic acid the free acid can readily be recovered by over-acidifying with hydrochloric acid.

Example 2

43.5 grs. di-iodo chelidamic acid are dissolved in 300 ccms. normal caustic potash solution and boiled during 5 hours under the reflux condenser with 13 grs. methyl iodide. On acidification the N-methyl di-iodo chelidamic acid is precipitated, which can be purified as explained with reference to Example 1.

Example 3.—N-propyl di-iodo chelidamic acid 10 grs. of the silver salt of di-iodo chelidamic acid dimethyl ester are heated during one hour to the boiling point with 3 grs. propyl iodide and 100 ccms. xylene. The solution is filtered, while still hot and after cooling the N-propyl di-iodo chelidamic acid dimethyl ester is separated out by adding petroleum ether. By saponification of the N-propyl di-iodo chelidamic acid dimethyl ester, melting at 89° C., there is produced N-propyl di-iodo chelidamic acid, which crystallizes in the form of cubes and melts at 156° C., carbon dioxide being split off.

*Example 4.—N-butyl di-iodo chelidamic acid*

10 grs. of the silver salt of the di-iodo chelidamic acid dimethyl ester are boiled during one hour with 3.5 grs. butyl iodide and 100 ccms. xylene. The reaction mixture is treated further as described with reference to Example 3.

The N-butyl di-iodo chelidamic acid dimethyl ester melts at 82° C.

The N-butyl di-iodo chelidamic acid crystallizes in the form of needles and melts at 145° C., carbon dioxide being split off.

Various changes may be made in the details disclosed in the foregoing specification without departing from the invention or sacrificing the advantages thereof.

We claim:

1. Compounds having the formula $$\text{XOOC-}\underset{\underset{CH_3}{|}}{\text{N}}\text{-COOX}$$ (with ring having I, I at top positions and C=O)

wherein X is hydrogen or an alkali metal, the compound, if X is hydrogen, being a well crystallizing colorless water-soluble acid melting at 174° C, under formation of carbon dioxide, forming with an alkali a readily water-soluble salt, but not showing the reaction with ferric chloride peculiar to the pyridones.

2. The alkali metal salts of N-methyl di-iodo chelidamic acid $$\text{MOOC-}\underset{\underset{CH_3}{|}}{\text{N}}\text{-COOM}$$

wherein M is an alkali metal, said salts, when treated with hydrochloric acid in excess, separating out the free N-methyl di-iodo chelidamic acid as a well crystallizing colorless acid melting at 174° C. under separation of carbon dioxide.

3. The sodium salt of N-methyl di-iodo chelidamic acid $$\text{NaOOC-}\underset{\underset{CH_3}{|}}{\text{N}}\text{-COONa}$$

said salt, when treated with hydrochloric acid in excess, separating out the free N-ethyl di-iodo chelidamic acid as a well crystallizing colorless acid melting at 174° C. under separation of carbon dioxide.

MAX DOHRN.
PAUL DIEDRICH.